UNITED STATES PATENT OFFICE 2,654,715

ANIMALIZATION OF CELLULOSE

James K. Dixon, Riverside, and Norman T. Woodberry, Stamford, Conn., assignors to American Cyanamid Company, New York, N. Y., a corporation of Maine No Drawing. Application August 25, 1950,
Serial No. 181,564

6 Claims. (Cl. 260—15)

This invention relates to a process for improving the properties of cellulosic materials and more particularly, to the production of animalized viscose rayon with decreased water absorption.

Many attempts have been made in the past to treat cellulosic material so that it becomes receptive to dyes ordinarily used only with wool and silk. Some of the attempts have been unsuccessful; others have achieved varying degrees of success. For example, as described in U. S. Patent No. 2,332,047, it has been found that cellulosic fibers, yarns and fabrics may be animalized with certain aminotriazine resins, the resulting animalized material allegedly possessing a high degree of resistance to wetting. Since urea resins and certain others were known as additives for cellulose solutions preparatory to fabrication of shaped articles capable of retaining their shapes, U. S. Patent No. 2,155,067, and in view of the known animalizing effect of some aminotriazine resins on cellulosic material, the addition of water-soluble melamine resin to a cellulose solution such as viscose for purposes of producing a regenerated cellulosic fiber or fabric which is animalized and has good water-resistance was tried. The process was not satisfactory, however, because the resin is not retained sufficiently during either the cellulose regeneration process when as much as 60–80% of the resin is lost or the subsequent dyeing process. Moreover, hydrolysis of most or all of the remaining resin takes place in the acid dyebath.

It is an object of the present invention to produce an animalized cellulosic fiber.

Another object of the present invention is to produce an animalized cellulosic fiber by addition of a resin to the cellulose solution before regeneration thereof.

It is another object of the present invention to treat cellulose solutions with an aminotriazine resin which will be retained in the cellulosic material derived therefrom in a sufficient amount for effective animalization.

It is still another object of the present invention to treat cellulose solutions such as viscose with an aminotriazine resin which will be retained during the cellulose regeneration process.

Another object of the present invention is to treat viscose with an aminotriazine resin which will be retained during the cellulose regeneration process and subsequent dyeing in an acid dyebath.

It is another object of the present invention to produce cellulosic material, i. e., fibers or fabrics, having an affinity for acid wool dyes.

Still another object of the present invention is the production of cellulosic material having decreased water absorption.

A further object of the present invention resides in the treatment of a cellulose solution such as viscose in such a manner that after regeneration of the cellulose, cellulosic material having an affinity for acid wool dyestuffs is obtained.

It is a further object of the present invention to treat viscose dope with an aminotriazine resin.

The above and other objects are attained by adding an aminotriazine resin acid colloid, such as a melamine resin acid colloid to a cellulose solution and regenerating the cellulose in the usual manner.

The invention will be described in greater detail in conjunction with the following specific example which is merely illustrative and is not intended to limit the scope of the invention. Parts are by weight.

Example 75 parts of a solution of resin colloid "A" containing 10% resin are diluted to 150 parts and added to 2,000 parts of cellulose xanthate solution prepared as described below and containing 8.5% cellulose. On addition of the resin colloid to the cellulose xanthate, the resin colloid is immediately precipitated in the viscose dope.

A thin film of the xanthate-resin mixture is regenerated by treatment with a bath containing 10% sulfuric acid, 1% zinc sulfate, 14% sodium sulfate, 10% glucose and 65% water. After standing for a period of time the regenerated cellulose film containing the resin is dried carefully at 110° C. and cured.

The resulting regenerated cellulose film is then dyed in an acid bath as follows: 2% of Calcocid Alizarine Blue SAPG in water containing 10% Glauber's salt and 2% sulfuric acid, all weights being based on the weight of the cellulose film, is used. The film is dyed for one hour at the boil and then rinsed with water and air dried. The regenerated cellulose film possesses a blue color whereas a similar regenerated cellulose film containing no resin exhibits no coloration when dyed in the same manner.

Preparation of cellulose xanthate solution 131 parts of bleached α-cellulose are steeped in 3,000 parts of 18% caustic soda solution for 30 minutes at about 25° C. The resulting mercerized cellulose is subjected to pressure in a hydraulic press until the ratio of caustic soda to cellulose is reduced to about 3.3. The top and bottom sheets in the hydraulic press are discarded and the remaining 8 middle sheets containing 150 parts of the original dry cellulose are shredded for 50 minutes in a suitable dough mixer and then aged for 3 hours. The resulting alkali cellulose is titrated with acid and found to contain 15.2% caustic soda which corresponds to a calculated 29.5% cellulose.

270 parts of the alkali cellulose containing 77 parts of cellulose are treated with 24.3 parts of carbon bisulfide and 17.5 parts of caustic soda. The carbon bisulfide is added all at once and the mixture is agitated in a suitable dough mixer at about 20° C. for 22 hours. After the xanthation is complete, the resulting mixture is diluted with 593 parts of water and the solution is stirred for 1½ hours. It is then placed in a refrigerator at about 5° C. and aged. The mixture contains 6.5% caustic soda and 8.5% cellulose. Before use a vacuum is applied to remove air bubbles from the solution.

Preparation of resin colloid "A"

100 parts of methylated trimethylol melamine are dissolved in 831 parts of water at about 22° C. 72.2 parts of glacial acetic acid are added to this clear solution and the mixture is allowed to stand for about 24 hours.

The melamine-formaldehyde resin acid colloid prepared as just described contains three mols of acetic acid for each mol of methylated trimethylol melamine. One may use other melamine-formaledhyde resins, for example, trimethylol melamine, and other acids, as formic acid, lactic acid, hydrochloric acid, etc. For example, 50 parts of essentially monomeric trimethylol melamine is added with stirring to 430 parts of water and 41.6 parts of glacial acetic acid. After ageing at about 22° C. for one hour the colloid is ready for addition to the xanthate dope. This resin also contains three mols of acetic acid per mol of melamine. Similarly, a suitable melamine resin acid colloid may be prepared by adding, for example, 0.8 mol of hydrochloric acid per mol of methylol melamine.

In general, the cationic aminotriazine resin acid colloids which are useful for addition to viscose dope in accordance with the process of the present invention are those described in U. S. Patents Nos. 2,345,543 and 2,417,014.

Suitable aminotriazines for reaction with aldehydes to form the condensation products used for preparing the cationic colloidal resin solutions useful in the present process are those containing two or three reactive amino groups, i. e., amino groups containing hydrogen atoms attached thereto. In addition to melamine are included, for example, N-guanyl melamine, ammeline, the guanamines including formoguanamine, acetoguanamine, propioguanamine, phenyl guanamine, etc., and N-alkyl-, N-aryl- and N-aralkyl-substituted derivatives thereof such as N - methylmelamine, N - phenylmelamine, N - benzylmelamine, N,N - diallylmelamine, etc., which contain a hydrogen atom attached to each of at least two of the nitrogen atoms.

From about 2–10% of resin based on the cellulose content of the viscose or other cellulose solution, and preferably about 5%, is used in our process.

The resin acid colloids are believed to consist of polymers having a low degree of polymerization, for example, around 10. The size of the polymer may be of the order of 100 Å. units. When this polymer is added to the strongly alkaline xanthate dope the resin is precipitated as a white, finely dispersed solid, particles of which may range anywhere from 0.2 to 100 $\mu$ in size. These particles are therefore not the original acid colloid polymers but must be agglomerates of the same. In order for the present process to operate at best advantage these agglomerates of the resin particles must be smaller than the spinneret openings so that the resin particles do not block the holes of the spinneret. The size of the resin agglomerates may be controlled by the ageing time of the resin colloid, by selection of a particular precipitating agent used as well as by the addition of dispersing agents or protective colloids, and the like.

If a dispersing agent is used in order to maintain the precipitated resin in a finely divided form, any of the usual cationic, anionic or non-ionic type agents are satisfactory. They may be added first to the resin colloid and then with it to the dope or they may be added to the dope after incorporation therein of the resin. In the former case, we preferably use cationic agents because of their compatibility with the cationic resin colloids; in the latter case, anionic dispersing agents are preferred. The non-ionic agents may advantageously be added in either manner, either alone or in conjunction with cationic or anionic agents.

The resin colloid may be added directly to the viscose dope which is then spun as usual or it may be added to the dope just behind the spinneret in which case an injection spinning procedure is followed and control of the size of the resin agglomerates is more critical.

Treatment of regenerated cellulose fiber directly with resin acid colloid is not satisfactory since the so-treated material, upon dyeing, exhibits poor color retention, poor resin retention and a stiff hand.

It is an advantage of the present invention that the aminotriazine resin acid colloids are retained about 100% by the viscose or cellulosic material during the spinning process whereas similar non-colloidal resins are not.

It is another advantage of the present invention that by its process, animalized cellulose material having a decreased water absorption of from about 85% for untreated to 60% for resin treated is obtained. As pointed out above, the resin is distributed through the fiber as fairly large particles. Apparently these particles dye well and give satisfactory animalization but because of the lack of molecular dispersion the cross-linking of the cellulose is inadequate to control water absorption more satisfactorily.

The water absorption is determined by the following procedure:

Skeins of the cellulosic fibers are washed, dried and conditioned for at least 24 hours at 73° F. and 50% relative humidity.

The weight of the conditioned skein is determined by using a stoppered weighing bottle. This weighed sample is then soaked in approximately 750 ml. of "resin treated" water for 15 min. at room temperature. After this, the skein is opened up and placed on a 15 inch square piece of cotton twill cloth in such a manner that the wet skein forms a circle which meets the edges of the cloth tangentially. The corners of the cloth are turned into the center and the resulting smaller square piece of cloth which now holds the skein is folded into quarters. This whole "package" is soaked in the same water bath for an additional 15 minutes. Then three such triangular "packages" are placed in the 11" diameter perforated stainless steel centrifuge basket with the side of the triangular package holding the skein at the bottom of the basket. The samples are then centrifuged for 3 minutes at 2175 R. P. M. The skeins are quickly transferred to the weighing bottles and the weight of water determined, and in turn the per cent water absorption.

The process of the present invention may be applied to solutions of other cellulosic derivatives than the xanthates, for example cellulose acetate, in solvents which are compatible with the acid colloids.

We claim:

1. A process which comprises adding to a viscose dope a cationic colloidal solution of an aminotriazine-aldehyde resin containing acid, and regenerating the cellulose whereby a material having an affinity for wool dyestuffs is obtained.

2. A process according to claim 1 in which said resin is a melamine-formaldehyde resin.

3. A process according to claim 1 in which said resin is a methylated trimethylol melamine.

4. A process which comprises forming a colloidal suspension in an alkaline viscose dope of particles of an aminotriazine-aldehyde resin formed by precipitation from a cationic colloidal acidic solution of said resin, and precipitating the cellulose with the colloidal resin incorporated therein as a shaped solid.

5. A process according to claim 4 in which said resin is a melamine-formaldehyde resin.

6. A process according to claim 4 in which said resin is a methylated trimethylol melamine.

JAMES K. DIXON.
NORMAN T. WOODBERRY.

References Cited in the file of this patent

UNITED STATES PATENTS

| Number | Name | Date |
|---|---|---|
| 2,332,047 | Bock | Oct. 19, 1943 |
| 2,345,543 | Wohnsiedler | Mar. 28, 1944 |
| 2,370,517 | Bass | Feb. 27, 1945 |
| 2,417,014 | Pollard | Mar. 4, 1947 |